United States Patent [19]

Thaler et al.

[11] Patent Number: 4,552,939
[45] Date of Patent: Nov. 12, 1985

[54] PREPARATION OF SULFONATED COPOLYMERS BY SUSPENSION COPOLYMERIZATION

[75] Inventors: Warren A. Thaler, Flemington, N.J.; S. Richard Turner, Pittsford, N.Y.; Robert D. Lundberg, Bridgewater, N.J.

[73] Assignee: Exxon Research and Engineering Co., Florham Park, N.J.

[21] Appl. No.: 563,062

[22] Filed: Dec. 19, 1983

[51] Int. Cl.$^4$ .................. C08F 228/02; C08K 5/17
[52] U.S. Cl. .................................. 526/287; 526/288; 428/402
[58] Field of Search ............... 526/287, 288; 524/236, 524/714; 428/402

[56] References Cited

U.S. PATENT DOCUMENTS

| 2,300,920 | 11/1942 | Heuer | 526/287 |
| 2,527,300 | 10/1950 | Dudley | 526/287 |
| 3,067,161 | 12/1962 | Roth | 526/287 |
| 3,281,384 | 10/1966 | Dietz | 524/236 |
| 3,328,367 | 6/1967 | Rees | 526/287 |
| 3,661,827 | 5/1972 | Taft | 524/714 |
| 3,844,986 | 10/1974 | Tomatu et al. | 526/287 |
| 4,373,056 | 2/1983 | Besecke et al. | 526/287 |

FOREIGN PATENT DOCUMENTS 2082600  3/1982  United Kingdom ............... 526/287

Primary Examiner—Joseph L. Schofer
Assistant Examiner—Peter F. Kulkosky
Attorney, Agent, or Firm—Richard E. Nanfeldt

[57] ABSTRACT

This invention relates to the preparation of sulfonated copolymers having a particle size in the range of 10 to 5,000 μm by a suspension copolymerization process, wherein an unsulfonated monomer is copolymerized with a sulfonated monomer such as the trioctylammonium salt of vinyl sulfonate monomer or the trioctylammonium salt of acrylamedomethylpropane sulfonate.

4 Claims, No Drawings

PREPARATION OF SULFONATED COPOLYMERS BY SUSPENSION COPOLYMERIZATION

FIELD OF THE INVENTION

This invention relates to the preparation of sulfonated copolymers having a particle size in the range of 10 to 5,000 μm by a suspension copolymerization process, wherein an unsulfonated monomer is copolymerized with a sulfonated monomer such as the trioctylammonium salt of vinyl sulfonate monomer or the trioctylammonium salt of acrylamidomethylpropene sulfonate.

BACKGROUND OF THE INVENTION

The preparation of sulfonate ionomers by copolymerization techniques has been of considerable interest because of the favorable economics associated with such processes versus those associated with sulfonated polymers prepared by sulfonation of a preformed polymer backbone. In addition it is possible to arrive at structures by copolymerization that are not achievable by preformed polymer sulfonation, i.e., different backbones, different functional groups, etc. for the most part emulsion techniques have been utilized for the preparation of the copolymers, i.e., sodium styrene sulfonate, styrene; sodium styrene sulfonate, isoprene. Obtaining the copolymer in the form of an emulsion presents problems for many applications of the solid polymer. Isolation techniques can be expensive and awkward to perform. Emulsions from sulfonate ionomers are more stable and difficult to break than ordinary polymer emulsions. Suspension polymerization offers a route to obtain copolymer directly in a useful solid form as small beads resulting from an easily carried out process.

The differences between emulsion and suspension polymerizations involve the mechanism of the polymerization and the size and stability of the resulting polymer particles. It is sufficient to say that an emulsion polymerization yields particles in the size range of 0.05 to 2 μM. These particles are colloidal in nature and in most cases require some external action in order to obtain flocculation and subsequent solid polymer isolation. On the other hand suspension polymerization yields large particles of 10–5000 μM in size. These are suspended in the polymerization process by the use of suspending agents as well as by mechanical agitation. Polymer isolation can be accomplished by simple filtration techniques. Because of obvious coagulation problems the suspension technique is most often accomplished with plastic-like polymers, e.g., styrene, PVC.

SUMMARY OF THE INVENTION

Until now suspension copolymerization has not been utilized to prepare sulfonated polymers because of the solubility of the ionic comonomer in the aqueous phase. Thus the sulfonated comonomer is not present at the locus of polymerization in the monomer droplet. This invention discloses a novel solution to this problem by the use of oil soluble ammonium sulfonate monomers. These monomers partition in an aqueous, hydrocarbon monomer mixture, e.g., styrene, into the organic phase where polymerization occurs, and become incorporated into the styrene backbone to form the ionomeric copolymer. This process has been accomplished with styrene or a similar unsulfonated monomer with either the trioctylammonium salt of vinyl sulfonate, acrylamidomethylpropane sulfonate (AMPS), or styrene sulfonate.

The sulfonated copolymers prepared by this process can be used in various applications such as in foams, as a gelling agent for a solution or as a drilling mud additive.

GENERAL DESCRIPTION OF THE INVENTION

The present invention relates to a suspension polymerization process for preparing sulfonated copolymers of an unsulfonated monomer having the structure of:

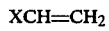

wherein X can be a saturated or unsaturated aliphatic group, a cycloaliphatic group or an aromatic; and a sulfonated monomer selected from the group consisting of trioctylammonium salt of vinyl sulfonate monomer and trioctylammonium salt of acylamidomethylpropane sulfonate monomer and the trioctylamim salt of styrene sulfonate. The resultant sulfonated polymers produced by this suspension polymerization process having an Mn of about 10,000 to about 500,000, more preferably about 20,000 to about 300,000 and most preferably about 50,000 to about 200,000. The sulfonated copolymers of the instant invention which are water insoluble having about 0.1 to about 4.0 wt.% sulfur therein, more preferably about 0.27 to about 3%, and most preferably about 0.3% to about 2%. The particle size range of the resultant sulfonated polymer is about 10 to about 5,000 μm, more preferably about 20 to about 1,000, and most preferably about 30 to about 50 μm.

Suitable amines must have alkyl groups less than 10 carbons in the longest segment of any chain and must contain a total of more than 16 carbons. Preferable alkyl chains have not more than 8 carbons and the total number of carbons is at least 18, most preferably about 18 to 24 carbons.

If the number of carbons in the amine is too small the AMPS monomer will not be incorporated into the polymer. However, if the chain length of the alkyl groups on the amine are too long, an emulsion is obtained instead of a filterable suspension.

While these general concepts will apply to sulfonate monomers in general, the operational window for amine chain length may differ somewhat from one sulfonate monomer to another. For example, styrene sulfonate has a greater tendency to be solubilized in the oleophillic phase, than vinyl sulfonate; therefore it would be expected that the preferable alkyl chain would be not more than 8 carbons, but the total number of carbon atoms would be in the range of 14 to 20 carbons.

Generally the suspension polymerization process of the instant invention can be described by the steps of:

(a) forming a solution of free radical initiator, emulsifier and suspending agent dissolved in the water; adding a mixture of the unsulfonated monomer, sulfonated monomer to the aforementioned solution to form the reaction solution, heating the reaction solution under a nitrogen blanket to a temperature of at least 40° C. for at least 2 hours to cause polymerization to occur; cooling the reaction solution, separating the formed bead-like polymer from the reaction solution by filtration means, washing the recovered bead like polymers, and drying the bead like polymer by vacuum means.

The unsulfonated monomers which can be employed in the instant suspension copolymerization process having the general structure of:

$X-CH=CH_2$ wherein X is a saturated or unsaturated aliphatic group, a cycloaliphatic group or an aromatic group. A preferred monomer is styrene. Other suitable monomers are, unsaturated hydrocarbons, including derivatives of styrene, butadiene, isoprene, or combinations thereof.

The trioctylammonium salt of sulfonate monomers used in the instant invention are prepared by contacting an aqueous solution of the acidified sulfonate with an organic solution of the amine and evaporation of the organic layer. Trioctylammonium salts may also be generated in situ. Other suitable sulfonate monomers which can be used include tertiary amine salts of styrene sulfonate acid, sulfoethyl methacrylic acid, allylsulfonic acid, vinyl benzyl sulfonic acid, and other sulfonic acid monomers listed in Yocum and Nyquist, "Functional Monomers."

The weight ratio of sulfonated monomer to unsulfonated monomer in the reaction solution is about 0.005 to about 0.8, more preferably about 0.01 to about 0.3, and most preferably about 0.015 to about 0.2. The concentration of unsulfonated monomer and sulfonated monomer in the reaction solution is about 5 to about 50 total grams of monomer per 100 ml. of water, more preferably about 10 to about 45, and most preferably about 20 to about 40.

Suitable emulsifiers used in the instant suspension polymerization process are alkylsulfates, alkylsulfonates and aralkylsulfonates. The concentration of emulsifier in the reaction solution is about 0.1 to about 0.5 grams/1000 ml of water.

Suitable suspending agents employed in the instant suspension polymerization process are stearic acid, polyethylene oxide PG 20M (Union Carbide). The concentration of suspending agent in the reaction solution is about 1 to about 8 grams per 1000 ml of water.

A suitable free radical initiator which can be used in the instant suspension polymerization process is AIBN. The concentration of the free radical initiator in the reaction solution is about 0.2 to about 10 grams per 1000 ml of water.

The suspension polymerization is carried out at a temperature of about 30° to about 1000° C., more preferably about 40 to about 90, and most preferably about 50 to about 80 for about 1 to about 48 hours, more preferably about 4 to about 36, and most preferably about 5 to about 20 hours.

DETAILED DESCRIPTION OF THE PREFERRED EMBODIMENTS

EXAMPLE I

Preparation of Trioctylammonium Salt of Vinyl Sulfonate

A glass column was packed with 1500 ml. of Amberlite IR-120 plus ion exchange resin; 520 g (1 mole) of 25% sodium vinyl sulfonate was passed through the resin column slowly. The resin was then rinsed with 300 ml. of distilled water.; 0.5 ml. of the above aqueous solution was dissolved in 40 ml. of methanol. This solution was then titrated with 0.1N ethanolic NaOH to a Phloxine B endpoint. Results: 1.49 meq./ml.; 432.13 g Tri-N-octylamine was dissolved in 1000 mol. toluene, 1 meq. amine:1 meq. acid. The solution was poured into a large separatory funnel. Vinyl sulfonic acid solution (820 ml.) was added to the funnel. The contents of funnel were shaken well then allowed to separate. The water layer was removed and discarded. The toluene layer was stripped off at 35° C. until nothing was seen coming off; 610 g product was recovered.

EXAMPLE II

Preparation of Trioctylammonium Salt of AMPS

Acrylamidomethylpropane sulfonic acid (AMPS) 10.0 g was added to 50 ml. of toluene. This slurry was slowly added to 17.0 g of trioctylamine in 50 ml. of toluene and the resulting solution mixed for ca. 30 minutes. The toluene was stripped on a rotary evaporator to yield the desired salt as a clear orange oil.

EXAMPLE III

Suspension Copolymerization of Styrene and the Trioctylammonium Salt of Vinyl Sulfonic Acid The following ingredients were charged into a 1 l-4 necked round bottomed flask: sodium dodecylsulfate 0.1 g, stearic acid 1.5 g, polyethylene oxide PG220M (Union Carbide) 1.5 g, AIBN (azobisisobutylronitrile) 0.7 g, distilled water 500 ml. After most of the initial ingridients were dissolved a mixture of 150 g styrene and 30.0 g of the vinyl sulfonic acid salt were added. The solution was purged with N and heated with stirring to 80° C. for 20 hours. After cooling the bead-like polymer was separated by filtration with an 80 mesh sieve. The polymer was washed three times with distilled water and then put into a vacuum oven at 40° C. for drying. The resulting polymer was found to be readily soluble in toluene. It contained 0.68% S.

EXAMPLE IV

Suspension Copolymerization of Styrene and the Trioctylammonium Salt of Acrylamidomethylpropane sulfonic acid (AMPS)

The same procedure as described in Example III was followed in this experiment with the substitution of 20.0 g of the trioctylammonium salt of AMPS for the vinyl sulfonic acid salt. As before white beads of polymer (146.0 g) were obtained. This polymer was readily soluble in toluene and gave a sulfur analysis of 0.48%.

EXAMPLE V

Conversion of Trioctylammonium Vinyl Sulfonate Styrene Copolymer to the Sodium Salt The alkylammonium salt of the copolymer was converted to the sodium salt by treating a toluene solution of the copolymer with excess sodium methoxide and then precipitating the solution in isopropanol. This polymer containing 0.16% S. The effect of the association of the metal sulfonate units was observed by dissolving the polymer in toluene at a concentration of 0.5 wt.%. viscosity determination on a Brookfield viscometer yielded 1400 cp. These ionic associations were solvated by the addition of 10% methanol which resulted in a viscosity decrease to 8.0 cp.

EXAMPLE VI

Conversion of the Trioctylammonium AMPS Styrene Copolymer to the Sodium Salt

This conversion was accomplished in an identical fashion to that described in Example V. The resulting polymers contained 0.19% S. When dissolved at 0.5 wt.% in toluene a gel with viscosity of >7000 cp was observed. Addition of 10% methanol reduced this value to 40 cp.

EXAMPLE VII

Effect of tertiary amine structure on the copolymerization of styrene with tertiary amine-AMPS monomer Amine salts of AMPS were prepared by contacting an equivalent of amine in 500 ml of toluene with 50.0 g of AMPS. The toluene was removed at 40° C. in vacuo.

Sodium dodecylsulfate (0.2 g), stearic acid (3.0 g), PEG 20M (3.0 g), AIBN (0.7 g), and 500 ml deaerated distilled water were placed in a stirred flask. Styrene (150 g) and the amine salt (4 mole % based on styrene) was added, the reaction purged for 20 min. with nitrogen and then heated at 80° C. for 17 hrs.

The isolated polymer was converted to the sodium salts by reacting 50 g of the copolymer amine salt in 500 ml of toluene with 30 ml of 25% sodium methoxide. The product was isolated by precipitating in a high speed mixer using 3 liters of isopropyl alcohol, washing several times with additional alcohol and drying overnight in vacuum at 50°.

The results in the table below show the composition of the neutralized polymer isolated in this fashion. The twelve carbon amine, tributylamine did not impart sufficient styrene solubility to AMPS and the copolymerization was unsuccessful. Using a longer alkyl chain, the twelve carbon amine demethyldecylamine gives dramatically better incorporation of AMPS into the polymer but an emulsion polymerization rather than a suspension polymerization results. Still longer alkyl chain amines give even better incorporation but again only emulsions were produced. Even in the absence of dispersant or surfactant, emulsions were obtained. Apparently, alkyl chains $C_{10}$ or longer on the amine provide sufficient surfactancy to give emulsions in the absence of any additives.

The effective amines must not contain alkyl groups greater than about $C_8$ to $C_9$ and the combined number of amine carbons must be greater than $C_{12}$. An example of such amine is trioctylamine. Utilizing trioctylamine AMPS gave suspension polymerization with bead like products and effective incorporation.

TABLE I

| | Styrene-Amine AMPS Copolymers | | | | |
| | | Analysis Neutralized Polymer Product | | | |
| Amine-AMPS Salt (Mole %) | S % | Meq/100 g | N % | Meq/100 | Polymerization Type |
|---|---|---|---|---|---|
| Tributylamine-AMPS (4%)[a] | 0.015 | 0.47 | 0.048 | 3.4 | Suspension |
| Decyldimethylamine-AMPS (4%)[a] | 0.40 | 12.4 | 0.169 | 12.1 | Emulsion |
| Dodecyldimethylamine-AMPS (4%)[a] | 0.90 | 28.1 | 0.457 | 32.5 | Emulsion |
| Dodecyldimethylamine-AMPS (4%)[b] | 0.87 | 27.1 | 0.441 | 31.5 | Emulsion |
| Dodecyldimethylamine-AMPS (4%)[c] | 1.00 | 31.2 | 0.495 | 35.3 | Emulsion |
| Octadecyldimethylamine-AMPS (4%)[a] | 0.95 | 29.6 | 0.473 | 33.8 | Emulsion |
| Octadecyldimethylamine-AMPS (4%)[c] | 1.04 | 34.0 | 0.477 | 32.4 | Emulsion |
| Trioctylamine-AMPS (4%)[a] | 0.41 | 12.8 | 0.323 | 23.1 | Suspension |

[a]Standard dispersant package: sodium lauryl sulfatet, 0.2 g; stearic acid, 3.0 g; PG 20M, 3.0 g (see Experimental).
[b]Dispersant: 0.1 g sodium lauaryl sulfate only.
[c]No dispersant.

What is claimed is:

1. A water insoluble copolymer of a hydrocarbon monomer of the structure:

where $R_1$=aryl, aralkyl, alkaryl, vinyl, propenyl, isopropenyl or allyl and $R_2$=H, alkyl, aryl, aralkyl and alkaryl, and the tertiary amine salt of a sulfonate monomer where the total carbons of the amine salt are 14 to 24, where the sulfonate monomer represents a weight ratio of 0.005 to 0.8 where the product is a particle of 10 to 5,000 μm, wherein said unsulfonated monomer is selected from the group consisting of diolefins, styrene, alkylstyrene, butadiene, isoprene, and the sulfonated monomer is selected from the group consisting of amine salts of vinyl sulfonate, acrylamidomethyl propane sulfonate, sulfoethyl methacrylate.

2. A water-insoluble copolymer of styrene and trioctylammonium salt of vinylsulfonate.

3. A water-insoluble copolymer of styrene and trioctylammonium salt of acrylamedomethylpropane sulfonate.

4. A suspension copolymerization process for preparing a water insoluble sulfonated copolymer which comprises the steps of:

(a) forming a solution of water, a suspending agent, an emulsifier, and a free radical indicator;

(b) forming a mixture of an unsulfonated monomer and an oil soluble sulfonated monomer;

(c) adding said mixture of said monomers to said solution to form a reaction solution;

(d) heating under a nitrogen blanket to a sufficient temperature for a sufficient time to cause polymerization of said forms to form a beadlike polymer; and (e) recovering said beadlike sulfonated copolymer from said reaction solution by filtration means, said sulfonated copolymer being formed from an unsulfonated monomer which is selected from the group consisting of diolefins, styrene, alkylstyrene, butadiene, isoprene, and the sulfonated monomer is selected from the group consisting of tertiary amine salts of vinyl sulfonate, acrylamidomethyl propane sulfonate, sulfoethyl methacrylate, wherein said amine portion of said amine salt has 14 to 24 total carbon atoms.

* * * * *